United States Patent
Kihara et al.

(10) Patent No.: US 9,067,316 B2
(45) Date of Patent: Jun. 30, 2015

(54) ROBOT SYSTEM AND TEACHING METHOD THEREFOR

(71) Applicant: KABUSHIKI KAISHA YASKAWA DENKI, Kitakyushu-shi (JP)

(72) Inventors: Eiji Kihara, Fukuoka (JP); Jiro Nakagawa, Fukuoka (JP); Osamu Yoshida, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 67 days.

(21) Appl. No.: 13/770,071

(22) Filed: Feb. 19, 2013

(65) Prior Publication Data
US 2014/0067122 A1 Mar. 6, 2014

(30) Foreign Application Priority Data
Aug. 31, 2012 (JP) .................. 2012-192352

(51) Int. Cl.
G05B 19/04 (2006.01)
G05B 19/18 (2006.01)
B25J 9/00 (2006.01)

(52) U.S. Cl.
CPC .............. *B25J 9/0081* (2013.01); *B25J 9/0096* (2013.01)

(58) Field of Classification Search
CPC .............................. B25J 9/0081; B25J 9/0096
USPC .................................................. 700/245–264
See application file for complete search history.

(56) References Cited

U.S. PATENT DOCUMENTS

| | | | |
|---|---|---|---|
| 6,681,151 B1* | 1/2004 | Weinzimmer et al. | 700/259 |
| 8,622,452 B2* | 1/2014 | Yamaguchi et al. | 294/106 |
| 2007/0142973 A1* | 6/2007 | Takizawa et al. | 700/259 |
| 2011/0185556 A1* | 8/2011 | Hirano et al. | 29/428 |
| 2012/0065779 A1* | 3/2012 | Yamaguchi et al. | 700/259 |

FOREIGN PATENT DOCUMENTS

| | | |
|---|---|---|
| CN | 1705540 | 12/2005 |
| CN | 102430530 | 5/2012 |
| JP | 01-240239 | 9/1989 |
| JP | 04-045664 U | 4/1992 |
| JP | 09-001437 | 1/1997 |
| JP | 10-225841 | 8/1998 |
| JP | 2010-234456 | 10/2010 |
| JP | 2011/145313 | 11/2011 |
| JP | 2011-240443 | 12/2011 |

OTHER PUBLICATIONS

Japanese Office Action for corresponding JP Application No. 2012-192352, Dec. 17, 2013.
Chinese Office Action for corresponding CN Application No. 201310084929.2, Apr. 3, 2015.

* cited by examiner

*Primary Examiner* — Bhavesh V Amin
(74) *Attorney, Agent, or Firm* — Mori & Ward, LLP

(57) ABSTRACT

A robot system according to an aspect of an embodiment includes a robot and a work bench. The robot has a plurality of joints including a first joint that is provided so as to be rotatable relative to an installation surface. On the work bench, a fixing part, by which a work member used in operations of the robot is fixed, is provided on a plate surface of a top plate with a rotation axis of the first joint serving as a normal line thereof, along a circular arc having a center at an intersection between the plate surface and the rotation axis.

21 Claims, 5 Drawing Sheets

ROBOT SYSTEM AND TEACHING METHOD THEREFOR

CROSS-REFERENCE TO RELATED APPLICATION

This application is based upon and claims the benefit of priority of the prior Japanese Patent Application No. 2012-192352, filed on Aug. 31, 2012, the entire contents of which are incorporated herein by reference.

FIELD

The embodiment discussed herein is directed to a robot system and a teaching method therefor.

BACKGROUND

Japanese Patent Application Laid-open No. 2011-240443 discloses a robot system provided with a robot that performs work by conducting predetermined operations and with a work bench on which work members, such as a workpiece to be worked by the robot and members used for the work by the robot, are arranged.

SUMMARY

A robot system according to an aspect of the embodiment is provided with a robot, a work bench, and a fixing part. The robot has a plurality of joints including a first joint that is provided so as to be rotatable relative to an installation surface. The work bench is provided in a working envelope of the robot. The fixing part is provided on the work bench along a virtual circular arc around an axis of the first joint to fix a work member used in operations of the robot.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

An embodiment of a robot system and a teaching method therefor disclosed herein will be described below in detail with reference to the accompanying drawings. Note that the embodiment is not limited to the embodiment illustrated below.

Figure 1:
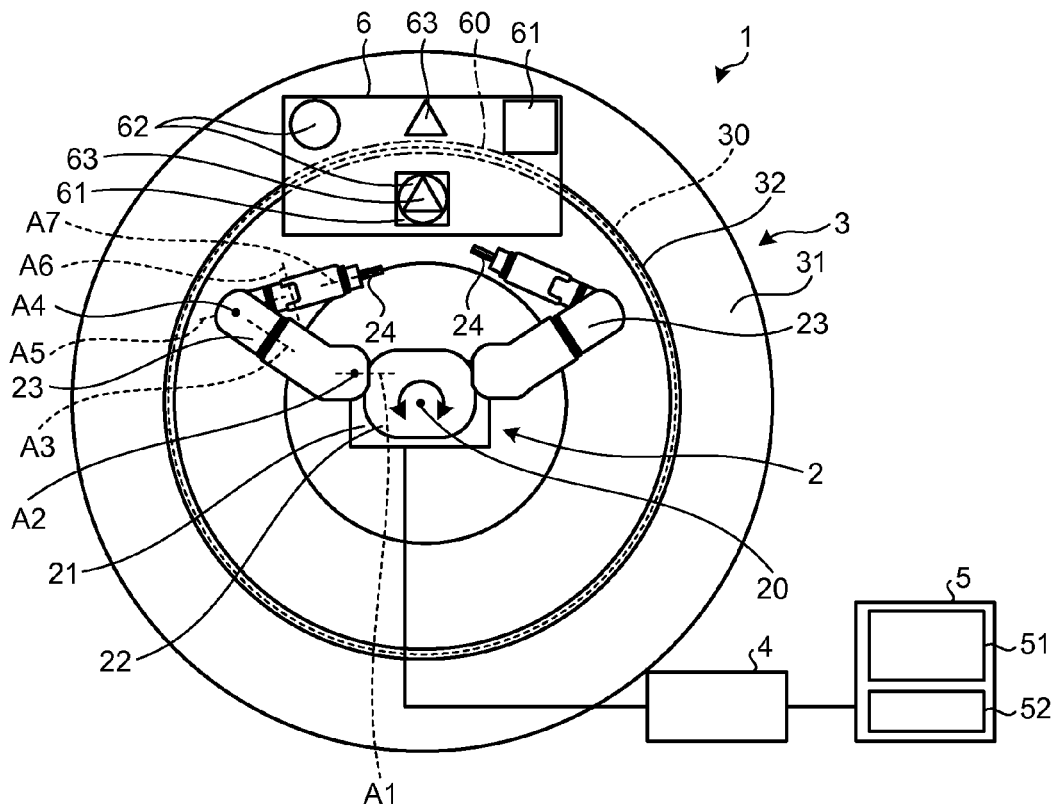
FIGS. 1 and 2 are explanatory diagrams illustrating top views of a robot system according to the embodiment.
Figure 2:
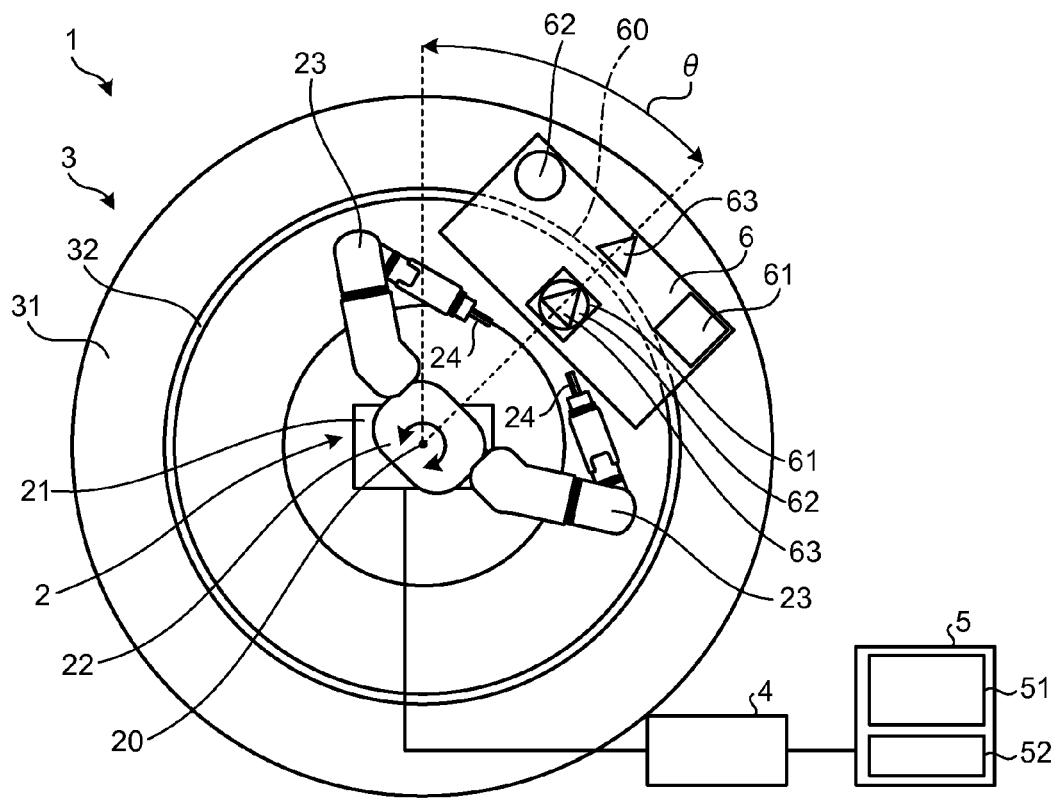

FIGS. 1 and 2 are explanatory diagrams illustrating top views of the robot system 1 according to the embodiment. As illustrated in FIG. 1, the robot system 1 is provided with a robot 2 as manipulating means, a work bench 3, a robot controller 4, and a teaching device 5. Herein, the robot system 1 includes a robot 2 having a plurality of joints including a first joint that is provided so as to be rotatable relative to an installation surface and a means for fixing a work member such as a workpiece used in operations of the robot provided along a virtual circular arc around an axis of the first joint.

The robot 2 is a dual-arm robot provided with a base 21, a torso 22, and two robotic arms 23. Here, the base 21 is installed on a horizontal installation surface such as a floor surface. The torso 22 is provided so as to be rotatable about a rotation axis 20 relative to the base 21. In other words, in the present embodiment, the torso 22 such as described above, among components of the robot 2, serves as a part functioning as a first joint provided so as to be rotatable relative to the installation surface for the robot 2.

The robotic arms 23 are two manipulators extending from the torso 22. In the present embodiment, for example, each of the robotic arms 23 of FIG. 1 has seven degrees of freedom about rotation axes (joints) A1 to A7 as indicated each by a dashed line or black dots, and thus, the robot 2 has rotation axes at 15 places in total.

In the present embodiment, the rotation axis 20 is perpendicular to the installation surface, and the rotation axis A1 is at a right angle with the rotation axis 20. The rotation axes A1 to A7 are configured such that the rotation axis A2 is at a right angle with the rotation axis A1; the rotation axis A3 is at a right angle with the rotation axis A2; the rotation axis A4 is at a right angle with the rotation axis A3; the rotation axis A5 is at a right angle with the rotation axis A4; the rotation axis A6 is at a right angle with the rotation axis A5; and the rotation axis A7 is at a right angle with the rotation axis A6. Note that "being perpendicular" and "being at a right angle" need only to be substantially so for those skilled in the art, and certain degrees of errors are allowed.

The leading ends of the robotic arms 23 such as described above are provided with end effectors 24 that can hold a workpiece to be worked and members used for work (hereinafter, the workpiece and members are mentioned as "work members 61, 62, and 63" when they are collectively called).

The teaching device 5 is an arithmetic unit that is provided with a display unit 51, an input unit 52, and the like, and that has a function to create data (teaching data) specifying a mode of operation to be performed by the robot 2 and stores the data in the robot controller 4. The teaching device 5 is composed of a personal computer or a programming pendant, and the like, and is communicably connected to the robot controller 4. In the present embodiment, the teaching device 5 has also a function as a simulator that displays the operation of the robot 2 in a virtual manner based on the created teaching data.

The display unit 51 is a display device that displays an image, and displays, for example, a figure modeling the robot 2 in a virtual manner. The input unit 52 is an information input device such as a keyboard or a touch panel. A user of the robot system 1 operates the input unit 52 such as described above to enter, into the teaching device 5, information such as teaching information including specific operations to be taught to the robot 2.

The teaching device 5 such as described above outputs the information such as the teaching information to the robot controller 4, and thereby teaches the installation position of the work member and a predetermined operation to the robot 2. The robot controller 4 is a control device that controls the operation of the robot 2, and operates the robot 2 based on the information such as the teaching information received from the teaching device 5. With this control, the robot 2 performs the predetermined operation as simulated by the teaching device 5.

The work bench 3 is at least partially provided within the working envelope of the robot 2. The work bench 3 has, at the center thereof, a circular opening for arranging the robot 2, and is provided with a disc-like top plate 31 with the rotation axis 20 serving as a normal line thereof. The upper surface of the top plate 31 is provided with a fixing part (fixture) 32 by which the work member used by the robot 2 for the work is to be fixed. The fixing part 32 is provided on the work bench 3 along a virtual circular arc around an axis of the first joint to fix a work member used in operations of the robot 2. The fixing part 32 is a circular arc-like projection provided in a projecting manner in a rail-like shape along a circular arc 30 having the center at an intersection between a plate surface (the upper surface) of the top plate and the rotation axis 20.

The work member to be fixed to the top plate 31 by the fixing part 32 is provided, on the bottom surface thereof to serve as a placing surface, with a fitting portion 60 to be fitted onto the projection that is the fixing part 32. For example, as illustrated in FIG. 1, if the work member is a plate 6 loaded with workpieces 61, 62, and 63, the bottom surface of the plate 6 is provided with the fitting portion 60 to be fitted onto the rail-like fixing part 32.

More specifically, the bottom surface of the plate 6 is provided with a groove-like recess, serving as the fitting portion 60, depressed to have a female shape reverse to the male shape of the fixing part 32 provided in a projecting manner in an arc-like shape. Then, the plate 6 is placed on the work bench 3 in the state in which the fitting portion 60 is fitted onto the fixing part 32.

In the robot system 1 such as described above, after the position of the work member is changed on the work bench 3, the robot 2 can perform the same operation as that performed before the position of the work member is changed. For example, assume that, in the state illustrated in FIG. 1, the robot 2 is performing an operation of placing the circular workpiece 62 on top of the rectangular workpiece 61 and placing the triangular workpiece 63 on top of the circular workpiece 62.

Then, in the case of changing the positions of the workpieces 61, 62, and 63 on the work bench 3, the plate 6 is slid (shifted) along the fixing part 32 provided in a projecting manner in an arc-like shape. For example, in the case of changing the positions of the workpieces 61, 62, and 63 to the right side of the front as viewed from the robot 2 in the state illustrated in FIG. 1, the workpieces 61, 62, and 63 are rotated as the whole plate 6 about the rotation axis 20, as illustrated in FIG. 2.

At this time, if the plate 6 is rotated about the rotation axis 20 by a rotation angle θ, the robot system 1 teaches the robot 2 the rotation angle θ as a rotation angle of the torso 22 so as to rotate the torso 22 of the robot 2 by the rotation angle θ.

With this operation, as illustrated in FIG. 2, the relative positions of the workpieces 61, 62, and 63 with respect to the robot 2 become the same as the relative positions illustrated in FIG. 1. Accordingly, the robot 2 can perform, in the state illustrated in FIG. 2, the same operation as the operation performed in the state illustrated in FIG. 1 by operating the robotic arms 23 in the same manner as taught in the state illustrated in FIG. 1.

In this manner, in the robot system 1, the upper surface of the top plate 31 is provided with the circular arc-like fixing part 32 having the center at the intersection between the upper surface of the top plate 31 of the work bench 3 and the rotation axis 20, and the work member is moved around the rotation axis 20 along the fixing part 32.

With this arrangement, in the robot system 1, when the work member is moved, it is possible to easily teach the robot 2 the operation to be performed using the work member whose position is changed, only by teaching the robot 2 the rotation angle of the work member rotated about the rotation axis 20.

Figure 3:
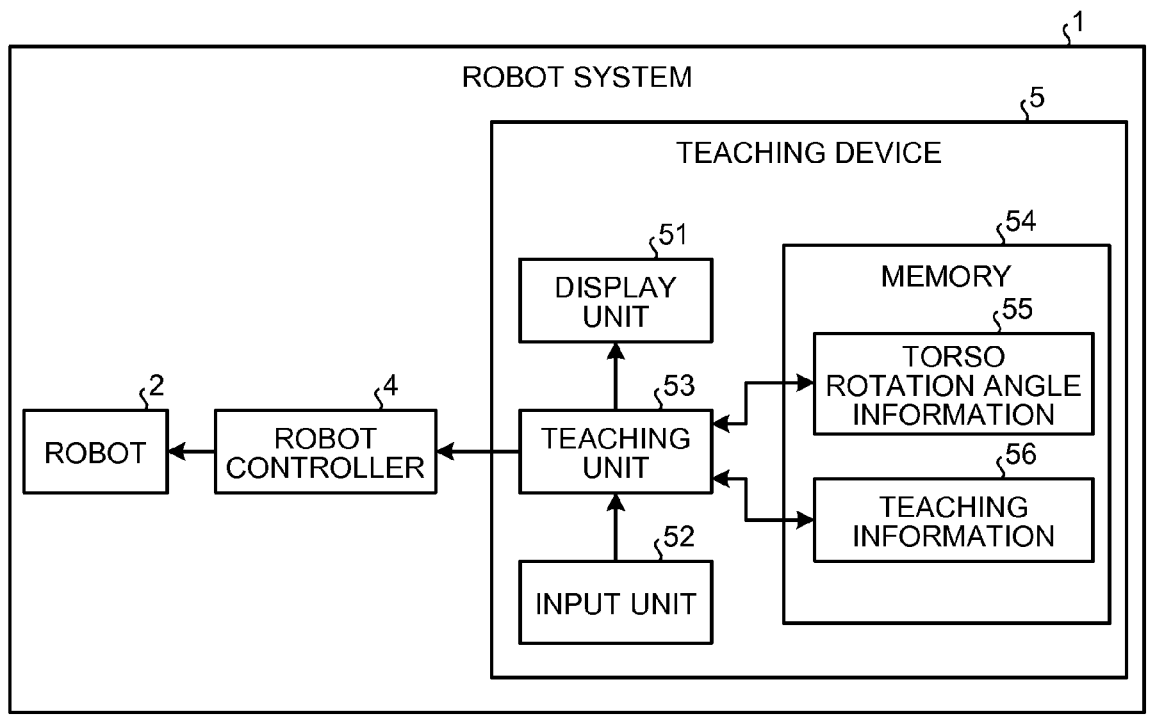
FIG. 3 is a block diagram illustrating the robot system according to the embodiment.

Next, description will be made of input and output of various types of data performed in the robot system 1. FIG. 3 is a block diagram illustrating the robot system 1 according to the embodiment. Note that the work bench 3, while being one of the components of the robot system 1, is omitted from the illustration here because the work bench 3 is not related to the input/output of the data.

As illustrated in FIG. 3, the robot system 1 includes the robot 2, the robot controller 4, and the teaching device 5. The robot 2 and the robot controller 4 will be omitted from the description here because they have already been described.

The teaching device 5 is provided with the display unit 51, the input unit 52, a teaching unit 53, and a memory 54. The memory 54 stores torso rotation angle information 55 indicating the rotation angle of the torso 22 of the robot 2 relative to a predetermined position specified to the work bench 3, and also stores teaching information 56 indicating the specific operations of the two robotic arms 23 to be taught to the robot 2.

In the robot system such as described above, the robot 2, as an initial state, is standing still at a predetermined initial posture face to face with the predetermined position specified to the work bench 3. Then, when making the robot 2 perform an operation, the user operates the input unit 52 to enter information such as positions of the workpieces 61, 62, and 63 and the plate 6 placed on the work bench 3, and details of operations to be performed by the robotic arms 23.

The user further operates the input unit 52 to enter, into the teaching device 5, a rotation angle of the torso 22 of the robot 2 relative to the work bench 3. The input unit 52 outputs operation signals in accordance with the input operation to the teaching unit 53.

Based on the operation signals entered from the input unit 52, the teaching unit 53 obtains the positions of the work members (such as the workpieces 61, 62, and 63 and the plate 6) and the details of the operations to be performed by the robotic arms 23, and stores the obtained data as the teaching information 56 in the memory 54. The teaching unit 53 also obtains, based on the operation signals entered from the input unit 52, the rotation angle of the torso 22 of the robot 2, and stores the rotation angle as the torso rotation angle information 55 in the memory 54.

Furthermore, based on the torso rotation angle information 55 and the teaching information 56 stored in the memory 54, the teaching unit 53 performs the simulation of operating the robot 2 in a virtual manner, and makes the display unit 51 display the simulation of the virtual operation of the robot 2.

Then, if the simulation confirms that the robot 2 will operate without any problem, the teaching unit 53 teaches the robot 2 the specific operations by outputting the torso rotation angle information 55 and the teaching information 56 to the robot controller 4.

Based on the torso rotation angle information 55 received from the teaching device 5, the robot controller 4 outputs a command to the robot 2 to rotate the torso 22 of the robot 2.

The robot controller 4 also outputs to the robot 2, based on the teaching information 56 received from the teaching device 5, a command to operate the robotic arms 23.

Thereafter, in the case of moving the work member by rotating it about the rotation axis 20 along the circular arc-like fixing part 32, the user operates the input unit 52 to enter a rotation angle of the work member into the teaching device 5. In the teaching device 5, the work bench 3 stores, in the memory 54, the newly entered rotation angle as the torso rotation angle information 55, and outputs the thus stored torso rotation angle information 55 to the robot controller 4.

The robot controller 4 rotates the torso 22 of the robot 2 based on the newly entered torso rotation angle information 55, and operates the two robotic arms 23 based on the teaching information 56 used in the operation of the robot 2 before the work member is moved. With this process, the robot 2 can perform, using the work member moved on the work bench 3, the same operation as the operation being performed before the work member is moved.

As described above, the robot system according to the embodiment is provided with the robot that performs the operations using the robotic arms extending from the torso provided so as to be rotatable relative to the base. The robot system is further provided with the work bench on which the fixing part by which the work member used in the operations by the robot is fixed, is provided on the plate surface of the top plate with a rotation axis of the torso serving as a normal line thereof, along the circular arc having the center at the intersection between the plate surface and the rotation axis.

In the robot system as described above, the work member can be moved by being rotated on the work bench along the circular arc having the center at the rotation axis of the torso of the robot. Accordingly, with such a robot system, when the work member is moved on the work bench, it is possible to easily teach the robot the operation using the work member whose position is changed, only by teaching the moving (rotation) angle of the work member as the rotation angle of the torso of the robot.

Figure 4:
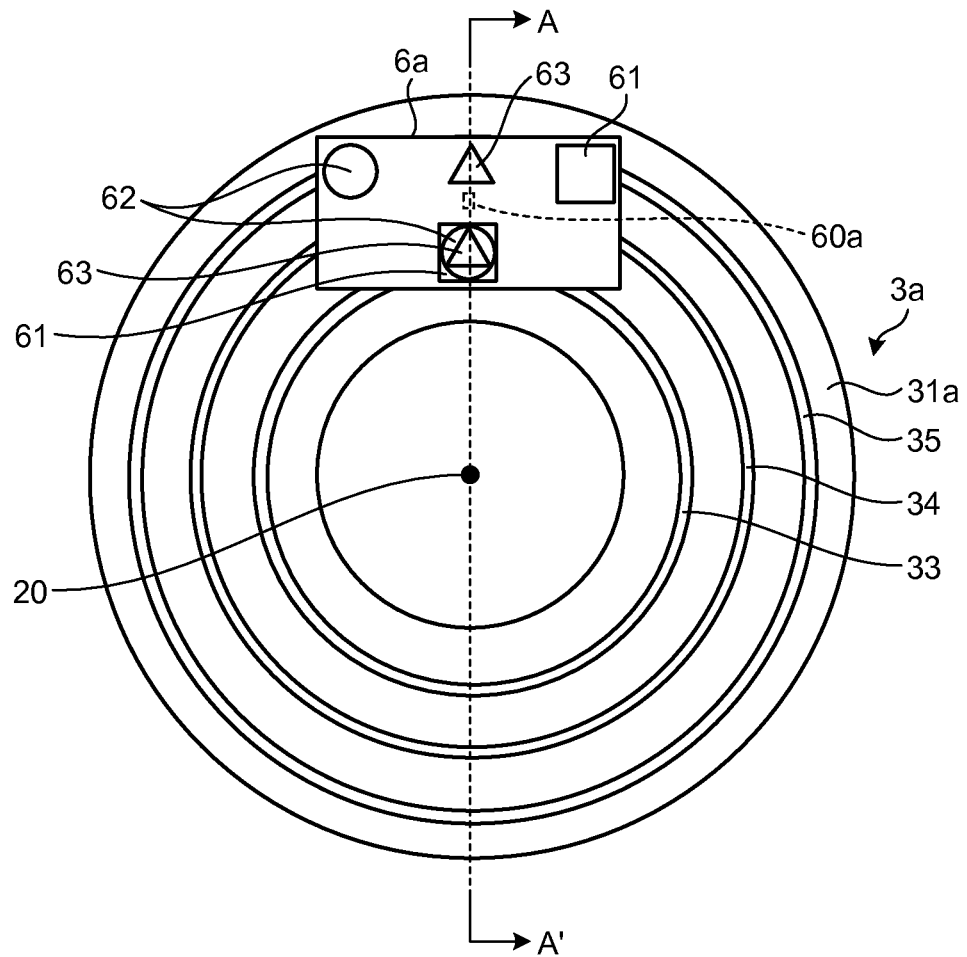
FIG. 4 is an explanatory diagram illustrating a top view of a work bench according to a first modification of the embodiment.

Note that the work bench according to the present embodiment is not limited to the work bench 3 illustrated in FIGS. 1 and 2. Modifications of the work bench according to the present embodiment will be described below. FIG. 4 is an explanatory diagram illustrating a top view of a work bench 3a according to a first modification of the embodiment, and FIG. 5 is an explanatory diagram illustrating a sectional view of the work bench 3a according to the first modification of the embodiment.

Here, FIG. 4, illustrates the work bench 3a viewed from the top and the state in which a plate 6a loaded with the workpieces 61, 62, and 63 is placed on the table 3a and held thereon. FIG. 5 illustrates a cross-section of the work bench 3a, the plate 6a, and the workpieces 61, 62, and 63 obtained by cutting along line A-A' illustrated in FIG. 4.

Figure 5:
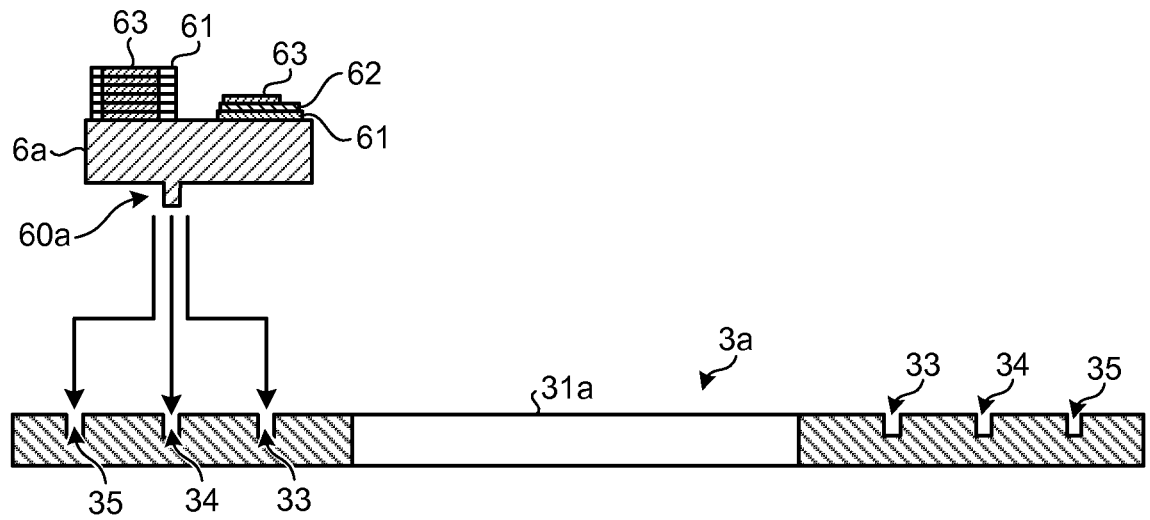
FIG. 5 is an explanatory diagram illustrating a sectional view of the work bench according to the first modification of the embodiment.

Here, among the components illustrated in FIGS. 4 and 5, the same components as those illustrated in FIG, 1 or 2 are given the same numerals as those of the components illustrated in FIG, 1 or 2, and thereby description thereof will be omitted.

As illustrated in FIGS. 4 and 5, the work bench 3a is provided, on the upper surface of a top plate 31a thereof, with fixing parts (fixtures) 33, 34, and 35 by each of which a work member is to be fixed, in a recessed manner in rail-like shapes along a plurality of circular arcs having different radii from each other and having the center at an intersection between a plate surface of the top plate 31a and the rotation axis 20.

Specifically, the work bench 3a differs from the work bench 3 illustrated in FIGS. 1 and 2 in that the fixing parts 33, 34, and 35 are grooves formed not in a projecting manner but in a recessed manner, and in that the fixing parts 33, 34, and 35 are formed in shapes of concentric circles having different radii from each other. Note that the fixing parts 33, 34, and 35 are formed so as to have the same groove width as each other.

The work member to be placed on the work bench 3a such as described above is provided, on the bottom surface thereof to serve as a placing surface, with a fitting portion 60a to be fitted into the fixing parts 33, 34, and 35. For example, if the work member is the plate 6a, the bottom surface of the plate 6a is provided, in a projecting manner, with the prism-like fitting portion 60a that is fittable into each of the fixing parts 33, 34, and 35.

Then, as illustrated in FIG. 5, the plate 6a that is loaded with the workpieces 61, 62, and 63 and to be placed on the work bench 3a is fixed in such a manner that the fitting portion 60a on the bottom surface of the plate 6a is fitted into any one of the fixing parts 33, 34, and 35 provided on the upper surface of the work bench 3a.

Thus, also in the case in which the work bench 3a is provided with the fixing parts 33, 34, and 35 in a projecting manner and the bottom surface of the work member is provided with the fitting portion 60a in a recessed manner, the work member can be moved on the work bench 3a along the circular arc having the center at the intersection between the plate surface of the top plate 31a and the rotation axis 20.

Therefore, also with the work bench 3a such as described above, when the work member is moved on the work bench 3a, it is possible to easily teach the robot 2 the operation performed using the work member, only by teaching the moving (rotation) angle of the work member as the rotation angle of the torso 22 of the robot 2.

In addition, with the work bench 3a, the distance between the robot 2 and the work member can be changed by changing the fixing part to be fitted with the fitting portion 60a among the fixing parts 33, 34, and 35, without moving the work member along the circular arc having the center at the rotation axis 20.

In the case of changing the distance between the robot 2 and the work member in this manner, it is necessary to change the teaching information 56. However, such a change is not a large change compared with a change in the teaching information 56 in the case of moving the work member in the right-left direction when viewed from the robot 2 without rotating the torso 22 of the robot 2.

Once being stored in the memory 54, the teaching information 56 after such a change can be used without change in the case of moving the work member along the fixing part 33, 34, or 35 for fixing the work member, unless the fixing part 33, 34, or 35 is changed.

Figure 6:
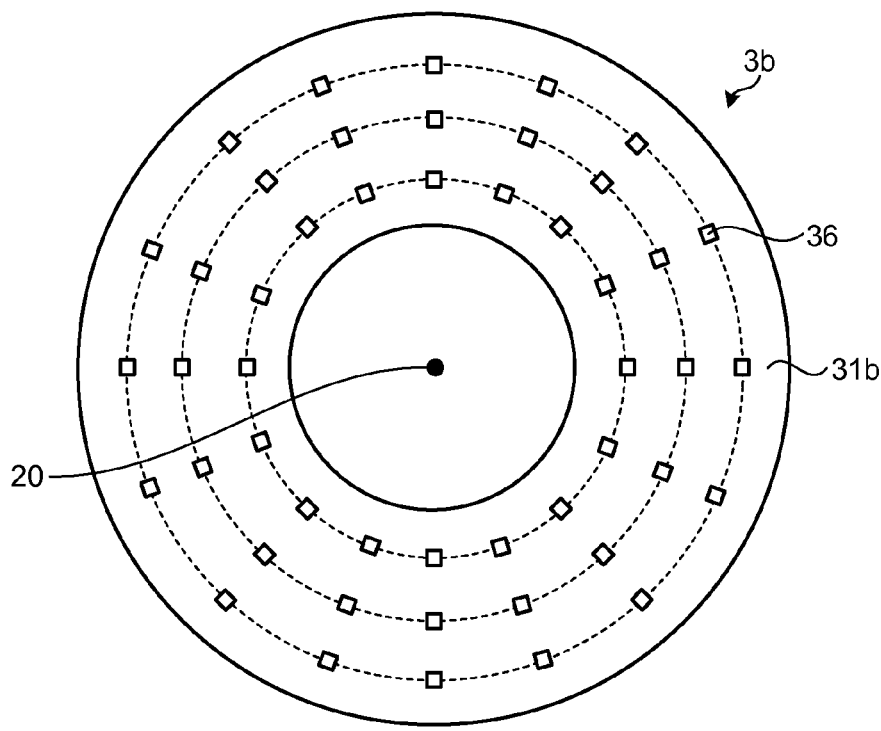
FIG. 6 is an explanatory diagram illustrating a top view of a work bench according to a second modification of the embodiment.

Next, a work bench 3b according to a second modification will be described with reference to FIG. 6. FIG. 6 is an explanatory diagram illustrating a top view of the work bench 3b according to the second modification of the embodiment. As illustrated in FIG. 6, the work bench 3b is provided, on the upper surface of a top plate 31b thereof, with a plurality of fixing parts (fixtures) 36 in a recessed manner at predetermined distance intervals along a plurality of circular arcs (refer to circles indicated by dashed lines in FIG. 6) having different radii from each other and having the center at an intersection between a plate surface of the top plate 31b and the rotation axis 20.

On the plate surface of the top plate 31b, the angle formed between the front as viewed from the robot 2 standing still in the above-described initial state (hereinafter mentioned as "front direction") and the direction from the rotation axis 20 toward each of the fixing parts 36 (hereinafter mentioned as "fixing part direction") is a predetermined angle.

Then, like, for example, the plate 6a illustrated in FIG. 5, a work member provided, on the bottom surface thereof, with the fitting portion 60a in a projecting manner is placed on the work bench 3b. More specifically, the work member is placed on the work bench 3b in the state in which the fitting portion 60a provided in a projecting manner on the bottom surface is fitted into one of the fixing parts 36.

On the work bench 3b such as described above, the angle formed between the front direction and the fixing part direction of each of the fixing parts 36 used for fixing the work member is known. Therefore, on the work bench 3b, when the work member is moved along one of the concentric circles indicated by dashed lines in FIG. 6, it is possible to make the robot 2 perform the same operation as that performed before the movement of the work member, only by teaching the angle formed between the fixing part direction of the fixing part 36 used for fixing the work member and the front direction.

While the case has been described here in which the fixing parts 36 are provided in a recessed manner, projecting fixing parts may be provided instead of the fixing parts 36 provided in a recessed manner. In such a case, the bottom of the work member is provided with a recess that is fittable, as a fitting portion, onto each of the fixing parts provided in a projecting manner.

Figure 7:
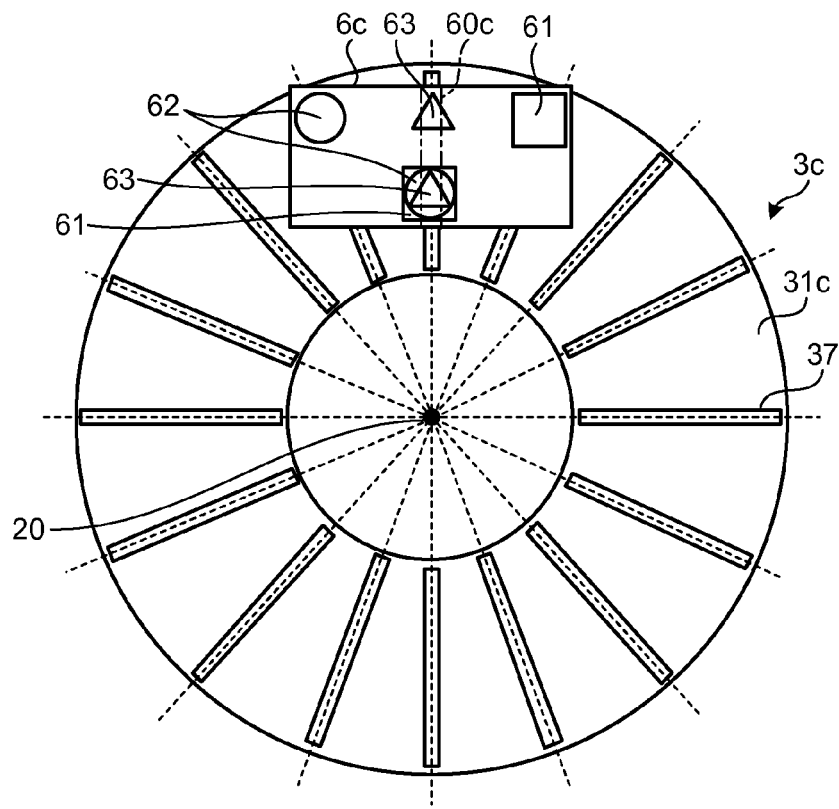
FIG. 7 is an explanatory diagram illustrating a top view of a work bench according to a third modification of the embodiment.

Next, a work bench 3c according to a third modification will be described with reference to FIG. 7. FIG. 7 is an explanatory diagram illustrating a top view of the work bench 3c according to the third modification of the embodiment. As illustrated in FIG. 7, the work bench 3c is provided, on the upper surface of a top plate 31c thereof, with line-like fixing parts (fixture) 37 in a projecting manner along straight lines (refer to straight lines indicated by dashed lines in FIG. 7) radially extending on a plate surface of the top plate 31c from the intersection between the plate surface of the top plate 31c and the rotation axis 20.

On the plate surface of the top plate 31c, the angle formed between the front direction as viewed from the robot 2 standing still in the above-described initial state and the direction from the rotation axis 20 toward each of the fixing parts 37 (hereinafter mentioned as "fixing part direction") is a predetermined angle.

A work member to be fixed to the top plate 31c by one of the fixing parts 37 is provided, on the bottom surface thereof to serve as a placing surface, with a fitting portion 60c to be fitted onto the line-like projection that is the fixing part 37. For example, as illustrated on FIG. 7, if the work member is a plate 6c loaded with the workpieces 61, 62, and 63, the bottom surface of the plate 6c is provided with the fitting portion 60c to be fitted onto the rail-like fixing part 37. More specifically, the bottom surface of the plate 6c is provided with a groove-like recess, serving as the fitting portion 60c, depressed to have a female shape reverse to the male shape of the fixing part 37 provided in a projecting manner in a line-like shape.

On the work bench 3c such as described above, the angle formed between the fixing part direction of each of the fixing parts 37 used for fixing the work member and the above-described front direction is known. Therefore, on the work bench 3c, when the work member is moved around the rotation axis 20 on the top plate 31c, it is possible to make the robot 2 perform the same operation as that performed before the movement of the work member, only by teaching the angle formed between the fixing part direction of the fixing part 37 used for fixing the work member and the front direction.

In addition, with the work bench 3c, it is possible, by moving the work member toward the extending direction of the fixing part 37, to easily adjust the distance between the robot 2 and the work member while maintaining the angle formed between the fixing part direction of the fixing part 37 used for fixing the work member and the front direction.

While the case has been described here in which the fixing parts 37 have a linear projection-like shape as viewed from the top, fixing parts having a linear recess-like shape as viewed from the top may be provided instead of the fixing parts 37. With such fixing parts, it is possible to fix, to the work bench, the work member provided, on the bottom thereof, with the fitting portion 60a in a projecting manner like the plate 6a illustrated in FIG. 4.

In the case in which the top plate 31c is provided, on the plate surface thereof, with the fixing parts that have a linear recess-like shape as viewed from the top and extends radially from the rotation axis 20, the fixing parts 33, 34, and 35 having a circular recess-like shape as viewed from the top illustrated in FIG. 4 may be provided in addition to such radially extending fixing parts.

In such a case, the bottom surface of the work member may be provided with a fitting portion having a cross-like shape as viewed from the bottom that is fittable into an intersecting portion between the fixing part having a linear recess-like shape as viewed from the top and the fixing part having a circular recess-like shape as viewed from the top. By employing such a configuration, it is possible, by fitting the fitting portion of the work member into the intersecting portion between the fixing part having a linear recess-like shape as viewed from the top and the fixing part having a circular recess-like shape as viewed from the top, to ensure to prevent a fixing position to which the work member is once fixed from changing during the operation of the robot 2.

Figure 8:
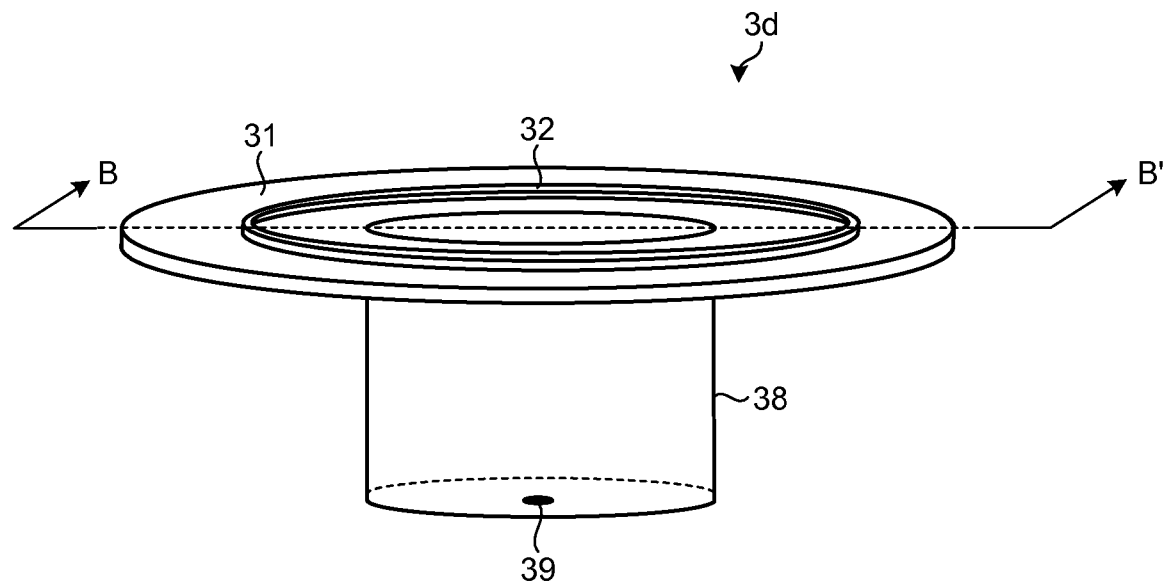
FIG. 8 is an explanatory diagram illustrating a perspective view of a work bench according to a fourth modification of the embodiment.
Figure 9:
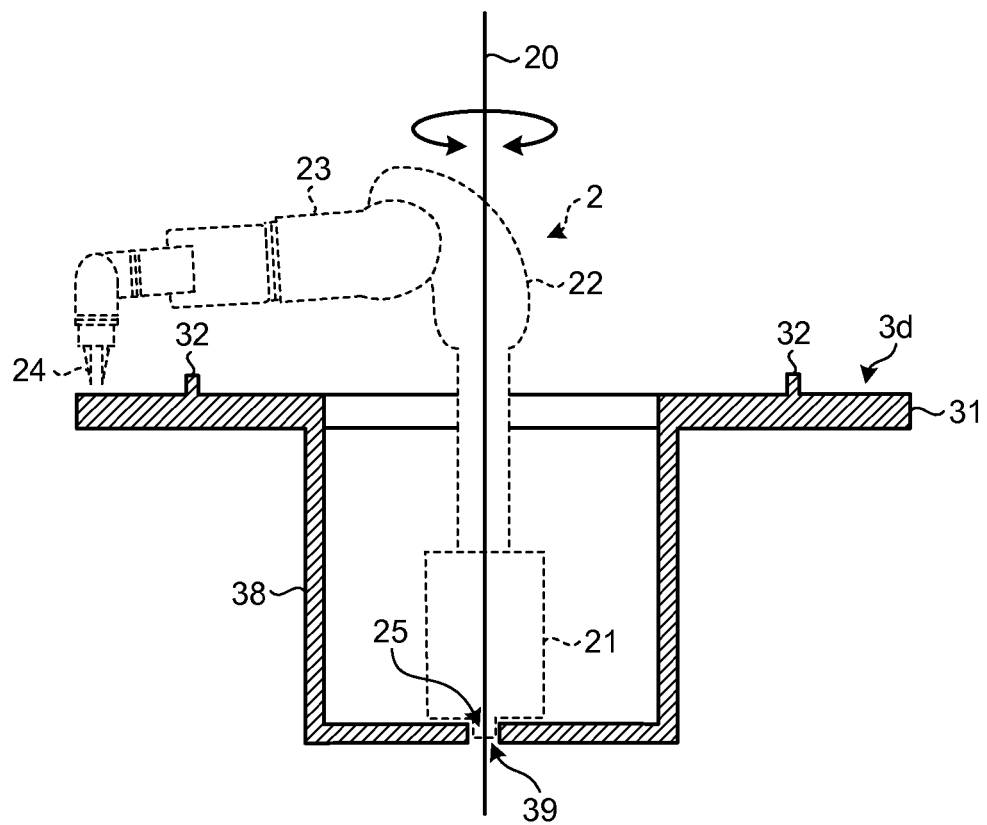
FIG. 9 is an explanatory diagram illustrating a sectional view of the work bench according to the fourth modification of the embodiment.

Next, a work bench 3d according to a fourth modification will be described with reference to FIGS. 8 and 9. FIG. 8 is an explanatory diagram illustrating a perspective view of the work bench 3d according to the fourth modification of the embodiment, and FIG. 9 is an explanatory diagram illustrating a sectional view of the work bench 3d according to the fourth modification of the embodiment. FIG. 9 illustrates a cross-section of the work bench 3d obtained by cutting along line B-B' illustrated in FIG. 8.

As illustrated in FIG. 8, the work bench 3d is provided with a top plate 31 including a fixing part 32 having the same shape as that illustrated in FIGS. 1 and 2, and with a leg 38 supporting the top plate 31 from below. The leg 38 has a closed-end cylindrical shape, and supports the top plate 31 in the state in which an open end at the top is connected to an opening provided at the center of the top plate 31. In addition, the leg 38 is provided, at the central part of the bottom surface thereof, with a hole 39 for fixing the robot 2.

As illustrated in FIG. 9, the robot 2 that performs operation using the work bench 3d such as described above is provided, at the central part of the bottom surface of the base 21 through which the rotation axis 20 passes, with a fitting portion 25 fittable into the hole 39 in a projecting manner, and is installed in a state in which the fitting portion 25 is fitted into the hole 39.

With this arrangement, it is possible to perform position adjustment between the center of the fixing part 32 that has a circular shape as viewed from the top and is provided on the upper surface of the top plate 31 in an easy and accurate manner, only by fitting the fitting portion 25 provided on the bottom surface of the base 21 of the robot 2 into the hole 39.

While, in the embodiment given above, the case has been described in which the circular opening is provided at the center of the top plate of the work bench, the opening at the center of the top plate may have any shape, such as an ellipse, a rectangle, and a polygon. Also, the top plate is not limited to having a circular shape, but may have any shape.

Furthermore, while, in the embodiment given above, the description has been made of the example of the dual-arm robot having the base 21 and the torso 22, the robot need not have any base or torso, but may be configured to be directly installed as a single manipulator on the installation surface. In the case of such a configuration, among the components of the manipulator, the first joint provided so as to be rotatable relative to the installation surface is directly installed onto the installation surface. Also, the axis configuration of the robot is not limited to the above-described embodiment, but the robot may have a parallel link mechanism and may have six or fewer degrees of freedom.

A teaching method according to the embodiment includes: teaching a robot an operation of the robot having a plurality of joints including a first joint that is provided so as to be rotatable relative to an installation surface; and teaching the robot a shift amount to change a rotation angle of the first joint according to a position of a fixing part for fixing a work member used in the operation provided along a virtual circular arc around an axis of the first joint.

Moreover, a teaching method according to the embodiment includes: a step for teaching a robot an operation of the robot having a plurality of joints including a first joint that is provided so as to be rotatable relative to an installation surface; and a step for teaching the robot a shift amount to change a rotation angle of the first joint according to a position of a fixing part for fixing a work member used in the operation provided along a virtual circular arc around an axis of the first joint.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot system comprising:
    a robot having a plurality of joints including a first joint that is provided so as to be rotatable relative to an installation surface:
    a work bench provided in a working envelope of the robot; and
    a fixing part including a plurality of installation positions, and provided on the work bench along a virtual circular arc having a radius from a rotation axis of the first joint to fix a work member used for a work by the robot or virtual circular arcs having different radii from the axis of the first joint to fix the work member which is used for the work by the robot,
    wherein the work member is loaded with a workpiece to be worked by the robot, and
    wherein the fixing part is configured to selectively fix the work member at any one of the plurality of installation positions for change of a position of the work member on the virtual circular arc.

2. The robot system according to claim 1, wherein
    the first joint is a torso that is provided so as to be rotatable relative to a base installed on the installation surface; and
    the robot comprises a robotic arm that is mounted on the torso and that has a plurality of joints.

3. The robot system according to claim 1, wherein the fixing part is provided along a plurality of such circular arcs having different radii from each other.

4. The robot system according to claim 2, wherein the fixing part is provided along a plurality of such circular arcs having different radii from each other.

5. The robot system according to claim 1, wherein the fixing part is provided at predetermined distance intervals along the circular arc.

6. The robot system according to claim 2, wherein the fixing part is provid at predetermined distance intervals along the circular arc.

7. The robot system according to claim 3, wherein the fixing part is provided at predetermined distance intervals along the circular arc.

8. The robot system according to claim 1, wherein the work member is provided with a fitting portion that is fitted to the fixing part.

9. The robot system according to claim 2, wherein the work member is provided with a fitting portion that is fitted to the fixing part.

10. The robot system according to claim 3, wherein the work member is provided with a fitting portion that is fitted to the fixing part.

11. The robot system according to claim 4, wherein the work member is provided with a fitting portion that is fitted to the fixing part.

12. The robot system according to claim 1, wherein the work bench is provided with the fixing part by which the work member is fixed along straight lines radially extending from the center of the virtual circular arc.

13. The robot system according to claim 2, wherein the work bench is provided with the fixing part by which the work member is fixed along straight lines radially extending from the center of the virtual circular arc.

14. The robot system according to claim 3, wherein the work bench is provided with the fixing part b which the work member is fixed along straight lines radially extending from the center of the virtual circular arc.

15. The robot system according to claim 4, wherein the work bench is provided with the fixing part by Which the work. member is fixed along straight lines radially extending from the center of the virtual circular arc.

16. The robot system according to claim 5, wherein the work bench is provided with the fixing part by which the work member is fixed along straight lines radially extending from the center of the virtual circular arc.

17. The robot system according to claim 1, further comprising:
    an input unit that enters teaching information indicating specific operations to be taught to the robot and also enters rotation angle information indicating a rotation angle of the first joint;
    a memory that stores the teaching information and the rotation angle information entered by the input unit; and
    a teaching unit that teaches the robot the rotation angle of the first joint based on the rotation angle information stored in the memory, and also teaches the robot the specific operations based on the teaching information stored in the memory.

18. A robot system comprising:
    a manipulating means including a joint that is provided so as to be rotatable relative to an installation surface; and
    a means for fixing a work member at a plurality of installation positions, the means for fixing being provided on a work bench along a virtual circular arc having a radius from a rotation axis of the joint to fix the work member used for a work by the manipulating means, wherein the work member is loaded with a workpiece to be worked the manipulating means, and wherein the means for fixing is configured to selectively fix the work member at any one of the plurality of installation ositions for change of a position of the work member on the virtual circular arc.

19. A teaching method for a robot system, the method comprising: a robot having a plurality of joints including a first joint that is provided so as to be rotatable relative to an installation surface; a work bench provided in a working envelope of the robot; and a fixing part including a plurality of installation positions, and provided on the work bench along a virtual circular arc having a radius from a rotation axis of the first joint to a fix a work member used for work by the robot, Wherein the work member is loaded with a workpiece to be worked by the robot, and wherein the fixing part is configured to selectively fix the work member at any one of the plurality of installation positions for change of a position of the work member on the virtual circular arc, acquiring teaching information indicating specific operations to be taught to the robot and rotation angle information indicating a rotation angle of the first joint;

storing the teaching information and the rotation angle information in a memory:

teaching the robot an operation of the robot based on the teaching information stored; in the memory; and teaching the robot a shift amount to change a rotation angle of the first joint based on the rotation angle information stored in the memory.

20. A teaching method for a robot system, the method comprising: a robot having a plurality of joints including a first joint that is provided so as to be rotatable relative to an installation surface; a work bench provided in a working envelope of the robot; and a fixing part including a plurality of installation positions, and provided on the work bench along a virtual circular arc having a radius from a rotation axis of the first joint to a fix a work member used for work by the robot, Wherein the work member is loaded with a workpiece to be worked by the robot, and wherein the fixing part is configured to selectively fix the work member at any one of the plurality of installation positions for change of a position of the work member on the virtual circular arc, a step for acquiring teaching information indicating specific operations to be taught to the robot and rotation angle information indicating a rotation angle of the first joint;

a step for storing the teaching information and the rotation angle information in a memory;

a step for teaching a robot an operation of the robot based on the teaching information stored in the memory; and a step for teaching the robot a shift amount to change a rotation angle of the first joint based on the rotation anele information stored in the memory.

21. A robot system comprising:

a robot having a plurality of joints including a first joint that is provided so as to be rotatable relative to an installation surface;

a work bench provided in a working envelope of the robot; and a fixing part provided on the work bench along a virtual circular arc around an axis of the first joint to fix a work member used in operations of the robot, wherein the fixing part selectively fixes the work member at one of a plurality of positions, and a relative position of the work member with respect to the axis of the first joint is same in each of the plurality of positions.

* * * * *